(12) United States Patent
Lin

(10) Patent No.: US 11,680,368 B2
(45) Date of Patent: Jun. 20, 2023

(54) SYNTHETIC LEATHER

(71) Applicant: Chun Wei Lin, Taichung (TW)

(72) Inventor: Chun Wei Lin, Taichung (TW)

( * ) Notice: Subject to any disclaimer, the term of this patent is extended or adjusted under 35 U.S.C. 154(b) by 40 days.

(21) Appl. No.: 17/340,135

(22) Filed: Jun. 7, 2021

(65) Prior Publication Data

US 2021/0395946 A1 Dec. 23, 2021

(30) Foreign Application Priority Data

Jun. 18, 2020 (TW) .................................. 109207687

(51) Int. Cl.
| | |
|---|---|
| *D06N 3/14* | (2006.01) |
| *B32B 27/12* | (2006.01) |
| *B32B 5/02* | (2006.01) |
| *B32B 7/12* | (2006.01) |
| *B32B 27/30* | (2006.01) |
| *B32B 27/40* | (2006.01) |
| *D06N 3/00* | (2006.01) |

(52) U.S. Cl.
CPC ............. *D06N 3/144* (2013.01); *B32B 5/024* (2013.01); *B32B 7/12* (2013.01); *B32B 27/12* (2013.01); *B32B 27/306* (2013.01); *B32B 27/40* (2013.01); *D06N 3/0006* (2013.01); *D06N 3/0056* (2013.01)

(58) Field of Classification Search
CPC .... D06N 3/144; D06N 3/0006; D06N 3/0056; B32B 5/024; B32B 7/12; B32B 27/12; B32B 27/306; B32B 27/40
See application file for complete search history.

(56) References Cited

U.S. PATENT DOCUMENTS

| | | | |
|---|---|---|---|
| 8,486,848 B2 | 7/2013 | Lin | |
| 2009/0233042 A1* | 9/2009 | Sadato | .................... B29C 66/71 |
| | | | 442/203 |
| 2009/0297794 A1 | 12/2009 | Lin | |
| 2015/0140275 A1* | 5/2015 | Abrams | .................. B32B 3/263 |
| | | | 156/60 |

FOREIGN PATENT DOCUMENTS

| | | | |
|---|---|---|---|
| CN | 1050577 | A * | 4/1991 |
| CN | 201437574 | U | 4/2010 |
| CN | 102317394 | A | 1/2012 |
| EP | 0393006 | A1 | 10/1990 |
| EP | 3156223 | A1 | 4/2017 |
| JP | 2019108619 | A | 7/2019 |
| KR | 20070037832 | A | 4/2007 |
| TW | M355246 | U | 4/2009 |

OTHER PUBLICATIONS

Machine Translation of CN 1050577 A; Patent Translate (Year: 1991).*

* cited by examiner

*Primary Examiner* — Callie E Shosho
*Assistant Examiner* — Bethany M Miller
(74) *Attorney, Agent, or Firm* — WPAT, P.C.

(57) ABSTRACT

Provided is a synthetic leather. The synthetic leather comprises a base cloth, a polymer layer formed on the base cloth and a surface unit covering the polymer layer; the surface unit is a functional layer or a combination of the functional layer and a print layer. The polymer layer is made of a PVB-based composition and excludes a crosslinking agent with at least one isocyanate group. The functional layer is made of a material containing a primary agent; the primary agent is PU, epoxy resin, PMA or PVB; when the primary agent is the PVB, the material further comprises a crosslinking agent with at least one isocyanate group. The synthetic leather has good properties of weather resistance, abrasion resistance and flexing resistance, and the synthetic leather can have a variety of printing patterns on its surface.

20 Claims, 6 Drawing Sheets

SYNTHETIC LEATHER

CROSS-REFERENCE TO RELATED APPLICATION

Pursuant to 35 U.S.C. § 119(a), this application claims the benefit of the priority to Taiwan Utility Model Application No. 109207687, filed on Jun. 18, 2020. The content of the prior application is incorporated herein by its entirety.

BACKGROUND OF THE INVENTION

1. Field of the Invention

The present disclosure relates to a synthetic leather, and more particularly, to a synthetic leather comprising a polyvinyl butyral (hereinafter referred to as PVB) layer.

2. Description of the Prior Arts

Referring to FIG. 1, Taiwan Model Patent TW M355246 U discloses a multi-functional laminate including a fabric layer 100 and a first film layer 101 formed on the fabric layer 100. The first film layer 101 is made of a film composition containing a polymer component, and the polymer component is PVB. The surface of the multifunctional laminate is the first film layer mainly made of PVB. However, there are still the following problems in practice: (1) the PVB-based layer of the surface of the multifunctional laminate has a sticky feeling at a temperature equal to or above 30° C., resulting in an unfavorable touch; (2) the surface abrasion resistance is insufficient; (3) the flexing resistance at low temperature is poor. It can be seen that the film layer mainly made of PVB is not suitable for a surface for the synthetic leather and its applications in the related technical field.

From above, it is clear that although the PVB meets the environmental protection requirements and can be used to substitute other materials such as polyvinyl chloride (PVC), the properties of PVB that are needed for the synthetic leather can be further improved.

SUMMARY OF THE INVENTION

Therefore, an objective of the instant disclosure is to provide a synthetic leather, which has good weather resistance, good abrasion resistance, good flexing resistance (especially good flexing resistance at low temperature) and good touch feeling.

The instant disclosure provides a synthetic leather. The synthetic leather comprises a base cloth, a polymer layer which is formed on the base cloth and a surface unit which covers the polymer layer; the surface unit is a functional layer or a combination of the functional layer and a print layer. The polymer layer is made of a PVB-based composition, and the PVB-based composition excludes a crosslinking agent with at least one isocyanate group. The functional layer is made of a material containing a primary agent; the primary agent is polyurethane (PU), epoxy resin, polymethylacrylate (PMA) or PVB; when the primary agent is the PVB, the material further comprises a crosslinking agent with at least one isocyanate group. In accordance with the instant disclosure, the term "PVB-based composition" refers to a composition containing PVB in the range from 50 wt % (percent by weight) to 100 wt % based on a total weight of the composition.

In accordance with the instant disclosure, the surface unit may be the functional layer. In certain embodiments, the synthetic leather may further comprise a second adhesive layer, which is disposed between the functional layer and the polymer layer.

In accordance with the instant disclosure, the surface unit may be the combination of the functional layer and the print layer; wherein the print layer covers the polymer layer, and the functional layer covers the print layer. Therefore, the synthetic leather may have a variety of printing patterns on its surface. In certain embodiments, the synthetic leather may further comprise a second adhesive layer, which is disposed between the print layer and the polymer layer.

In accordance with the instant disclosure, the surface unit may be the combination of the functional layer and the print layer; wherein the functional layer covers the polymer layer, and the print layer covers the functional layer. In certain embodiments, the synthetic leather may further comprise a second adhesive layer, which is disposed between the functional layer and the polymer layer.

In accordance with the instant disclosure, the synthetic leather may further comprise a surface functional layer which is formed on the print layer. In certain embodiments, the synthetic leather may further comprise a second adhesive layer, which is disposed between the functional layer and the polymer layer.

In accordance with the instant disclosure, the synthetic leather further comprises a first adhesive layer, which is disposed between the base cloth and the polymer layer.

In accordance with the instant disclosure, when the primary agent of the material which forms the functional layer is the PU, the material further comprises a crosslinking agent with at least one isocyanate group.

The technical effect of the instant disclosure is that the synthetic leather is provided with the surface unit disposed on the polymer layer made of the PVB-based composition, so that the synthetic leather can have properties such as good weather resistance, good abrasion resistance, good flexing resistance (especially good flexing resistance at low temperature) and good touch feeling; therefore, the synthetic leather of the instant disclosure may be conducive to subsequent printing processing operations.

Other objectives, advantages and novel features of the disclosure will become more apparent from the following detailed description when taken in conjunction with the accompanying drawings.

DETAILED DESCRIPTION OF THE PREFERRED EMBODIMENTS

Hereinafter, one skilled in the arts can easily realize the advantages and effects of the instant disclosure from the following examples. Therefore, it should be understood that the descriptions proposed herein are just examples for the purpose of illustrations only, not intended to limit the scope of the disclosure. Various modifications and variations could be made in order to practice or apply the instant disclosure without departing from the spirit and scope of the disclosure.

The preferred embodiments of the instant disclosure are hereinafter described in conjunction with the appended drawings, which are provided to illustrate the technical means adopted to achieve the objective of the instant disclosure.

Before the instant disclosure is described in detail, it should be noted that in the following description, similar elements are represented by the same number.

Figure 2:
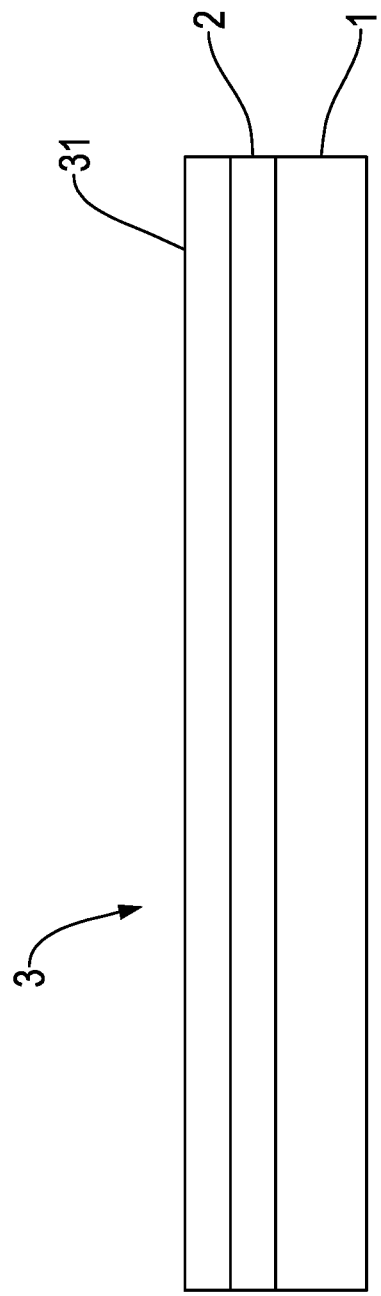
FIG. 2 is a schematic side view of Example 1.

With reference to FIG. 2, Example 1 of the synthetic leather of the instant disclosure includes a layer of base cloth 1, a polymer layer 2, and a surface unit 3. The polymer layer 2 is formed on the base cloth 1, and the surface unit 3 covers the polymer layer 2. In Example 1 of the synthetic leather, the surface unit 3 is a functional layer 31.

The base cloth 1 may be any cloth suitable for a synthetic leather. The type of the base cloth 1 may be a fabric which is produced by weaving (i.e. woven fabric) or knitting (i.e. knitted fabric) or a non-woven cloth. A material used to make the base cloth 1 may be polyester, Nylon, acrylic resin, polyolefin, PU, linen or cotton, but it is not limited thereto.

The thickness of the base cloth 1 can be adjusted in accordance with the practical applications of the synthetic leather. Preferably, the thickness of the base cloth 1 may be from 0.09 millimeters (mm) to 25 mm. More preferably, the thickness of the base cloth 1 may be from 0.18 mm to 8 mm.

The polymer layer 2 is made of a composition which comprises PVB as a main component (also called PVB-based composition) and does not comprise a crosslinking agent with at least one isocyanate group. Since the composition making the polymer layer 2 does not comprise a crosslinking agent with at least one isocyanate group, an excessive hardness of the polymer layer 2 which might result in decrease of its plasticity can be avoided.

Preferably, the polymer layer 2 may be made of a composition comprising PVB and a plasticizer component. The plasticizer component can be used to help the polymer layer 2 to bond to the base cloth 1 and enhance the plasticity of the polymer layer 2. The plasticizer component may be acetyl tributyl citrate (ATBC), acetyl trioctyl citrate (ATOC), an alkyl benzyl phthalate such as butyl benzyl phthalate, an alkyl phthalate, blown linseed oil, butyl ricinoleate, castor oil, a dialkyl adipate such as dihexyl adipate and dioctyl adipate (DOA), a dialkyl phthalate such as dibutyl phthalate (DBP) and dioctyl phthalate (DOP), di-isononyl-cyclohexane-dicarboxylate (DINCH), ethylene glycol di-N-butyrate, isodecyl diphenyl phosphate, N-ethyl toluenesulfonamide, polyethylene glycol, tert-butylphenyl diphenyl phosphate, toluenesulfonamide, triaryl phosphate ester blend, tributyl citrate (TBC), tricresyl phosphate (TCP), triethyl citrate (TEC), triethylene glycol, triethylene glycol bis(2-ethylhexanoate), triphenyl phosphate (TPP), 2-ethylhexyl diphenyl phosphate or any combination thereof, but it is not limited thereto.

Preferably, the PVB-based composition to make the polymer layer 2 may optionally comprise other components such as a crosslinking agent without any isocyanate groups, a lubricant, an antioxidant, an ultraviolet absorber, a polymer modifier, a pigment and a filler, but it is not limited thereto.

Preferably, said lubricant may be selected from a group consisting of: polyethylene wax, stearic acid, zinc octadecanoate, calcium octadecenoate and any combination thereof.

Preferably, said polymer modifier may be selected from a group consisting of: poly(methyl methacrylate) (PMMA), ethylene vinyl acetate (EVA), methyl methacrylate-butadiene-styrene copolymer (MBS), styrene-butadiene rubber (SBR), thermoplastic polyurethane (TPU) and any combination thereof. Said polymer modifier can be used to adjust the physical properties of the polymer layer 2 such as hardness, impact resistance, cold resistance, and flexing resistance.

The thickness of the polymer layer 2 can be adjusted in accordance with the practical applications of the synthetic leather. Preferably, the thickness of the polymer layer 2 may be from 0.03 mm to 20 mm. More preferably, the thickness of the polymer layer 2 may be from 0.03 mm to 0.8 mm.

The functional layer 31 is made of a material containing a primary agent. In accordance with the instant disclosure, the term "primary agent" refers to that the content of the primary agent is in the range from 50 wt % to 100 wt % based on a total weight of the material. The primary agent as a main component of the material may be PU, epoxy resin, PMA or PVB. When the primary agent is the PVB, the material may further comprise a crosslinking agent with at least one isocyanate group, so that the hardness of the obtained functional layer 31 can be higher than the hardness of the polymer layer 2. Preferably, the hardness of the functional layer 31 may be Shore A hardness of 40A to Shore D hardness of 80D; the hardness of the polymer layer 2 may be Shore A hardness of 20A to Shore D hardness of 50D.

Preferably, on the basis of the selection of the primary agent, the material may optionally comprise other agents such as a crosslinking agent, a matting agent, a pigment and a lubricant, which can satisfy the required surface properties of the synthetic leather. The matting agent may be silica ($SiO_2$), but it is not limited thereto.

The thickness of the functional layer 31 can be adjusted in accordance with the practical applications of the synthetic leather. Preferably, the thickness of the functional layer 31 may be from 0.01 mm to 0.8 mm. More preferably, the thickness of the functional layer 31 may be from 0.01 mm to 0.12 mm.

The material to make the functional layer 31 may be, for example, but not limited to, the components of the material listed in Table 1:

TABLE 1

| | Primary Agent | Component | Content (parts by weight) | Form of Material | Thickness of Functional Layer 31 After Drying (mm) |
|---|---|---|---|---|---|
| 1 | PU | PU solution | 100 | Oily Solution | 0.01-0.12 |
| | | Oil-based isocyanate crosslinking agent | 3-50 | | |
| | | $SiO_2$ powders | 0-20 | | |
| | | Polyethylene wax | 0-20 | | |
| 2 | PVB | PVB solution | 100 | Oily Solution | 0.01-0.12 |
| | | Oil-based isocyanate crosslinking agent | 3-50 | | |
| | | $SiO_2$ powders | 0-25 | | |
| | | Polyethylene wax | 0-20 | | |
| 3 | Epoxy resin | Epoxy resin solution | 101 | Oily Solution | 0.01-0.12 |
| | | Amine crosslinking agent | 0-20 | | |
| | | $SiO_2$ powders | 0-15 | | |
| | | Polyethylene wax | 0-10 | | |
| 4 | PU | Water-based PU | 100 | Aqueous suspension | 0.01-0.12 |
| | | Water-based isocyanate crosslinking agent | 3-50 | | |
| | | $SiO_2$ powders | 0-20 | | |
| | | Polyethylene wax | 0-20 | | |

TABLE 1-continued

| Primary Agent | Component | Content (parts by weight) | Form of Material | Thickness of Functional Layer 31 After Drying (mm) |
|---|---|---|---|---|
| 5 PMA | Water-based PMA | 100 | Aqueous suspension | 0.01-0.12 |
| | Water-based isocyanate crosslinking agent | 3-50 | | |
| | SiO₂ powders | 0-20 | | |
| | Polyethylene wax | 0-20 | | |
| 6 PU | TPU | 100 | Solid | 0.05-0.30 |
| | Pigment | 0-12 | | |
| | Calcium carbonate | 0-30 | | |

Preferably, the synthetic leather of Example 1 may optionally further comprise a second adhesive layer, which is disposed between the functional layer 31 and the polymer layer 2 (not shown in FIG. 2).

Preferably, the second adhesive layer may have a thickness ranging from 0.01 mm to 0.08 mm.

The second adhesive layer may adopt any of the adhesives listed in Table 2:

TABLE 2

| Component | Content (parts by weight) | Type of Adhesive | Thickness of Second Adhesive Layer After Drying (mm) |
|---|---|---|---|
| 1 PU solution | 100 | Oil-based | 0.01-0.08 |
| Oil-based isocyanate crosslinking agent | 3-100 | | |
| 2 PVB solution | 100 | Oil-based | 0.01-0.08 |
| Oil-based isocyanate crosslinking agent | 10-150 | | |
| 3 Water-based PU | 100 | Water-based | 0.01-0.08 |
| Water-based isocyanate crosslinking agent | 3-100 | | |
| 4 Water-based PVB | 100 | Water-based | 0.01-0.08 |
| Water-based isocyanate crosslinking agent | 3-150 | | |

The synthetic leather of Example 1 can be produced by any conventional process. For example, the PVB-based composition may be coated on the base cloth 1 by a coating method, and then the coated base cloth 1 is subjected to a drying process to form the polymer layer 2; after that, the functional layer 31 may be formed to cover the polymer layer 2. The way to form the functional layer 31 may be a coating method or a calendaring method, depending on which kind of the functional layer 31 is required and which type of the primary agent is used thereto. In particular, when the material to form the functional layer 31 is in an aqueous suspension form or an oily solution form, the coating method may be chosen to form the functional layer 31; otherwise, when the material to form the functional layer 31 is in a solid form, the calendaring method may be chosen to form the functional layer 31.

Figure 3:
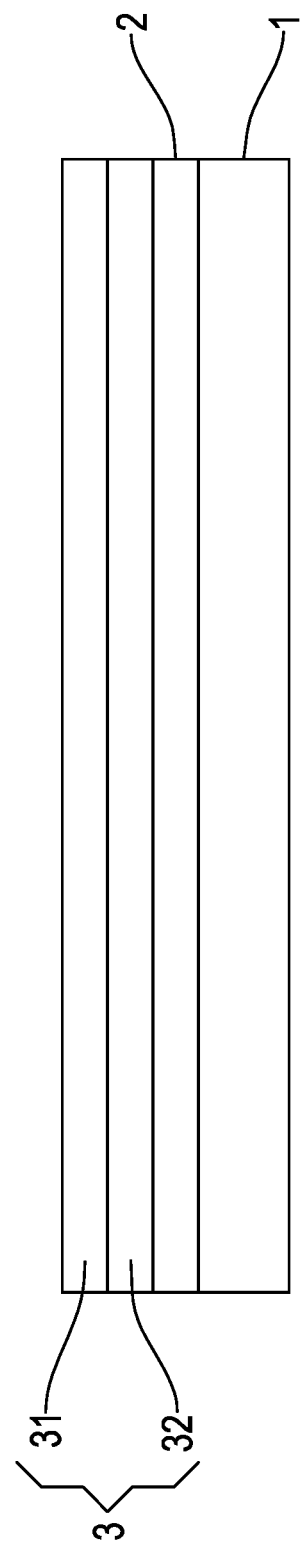
FIG. 3 is a schematic side view of Example 2.

Example 2 of the synthetic leather of the instant disclosure is shown in FIG. 3, which has a similar structure to Example 1. The difference between Examples 1 and 2 is that the surface unit 3 of Example 2 is the combination of the print layer 32 covering the polymer layer 2 and the functional layer 31 covering the print layer 32.

The ink material to form the print layer 32 may be a water-based ink or an oil-based ink. In order to stably cover the polymer layer 2, the ink material to form the print layer 32 may further comprise PVB; for example, an ink material may comprise 100 parts by weight of a PVB solution, 0-25 parts by weight of silica, 0-20 parts by weight of polyethylene wax, and 3-15 parts by weight of oily pigment.

The ink material to form the print layer 32 may adopt any of the ink materials listed in Table 3:

TABLE 3

| Component | Content (parts by weight) | Form of Ink Material | Thickness of Print Layer 32 After Drying (mm) |
|---|---|---|---|
| 1 PU solution | 100 | Oily Solution | 0.01-0.12 |
| Silica | 0-20 | | |
| Polyethylene wax | 0-20 | | |
| Oily pigment | 3-15 | | |
| 2 PVB solution | 100 | Oily Solution | 0.01-0.11 |
| Silica | 0-25 | | |
| Polyethylene wax | 0-20 | | |
| Oily pigment | 3-15 | | |
| 3 Water-based PU | 100 | Aqueous suspension | 0.01-0.12 |
| Silica | 0-25 | | |
| Polyethylene wax | 0-20 | | |
| Water-based pigment | 5-10 | | |
| 4 Water-based PMA | 100 | Aqueous suspension | 0.01-0.08 |
| Silica | 0-25 | | |
| Polyethylene wax | 0-20 | | |
| Water-based pigment | 5-10 | | |

Preferably, the synthetic leather of Example 2 may optionally further comprise a second adhesive layer, which is disposed between the print layer 32 and the polymer layer 2 (not shown in FIG. 3). Preferably, the second adhesive layer may have a thickness ranging from 0.01 mm to 0.08 mm. The adhesive used to form the second adhesive layer may be any of those as described in Example 1.

Figure 4:
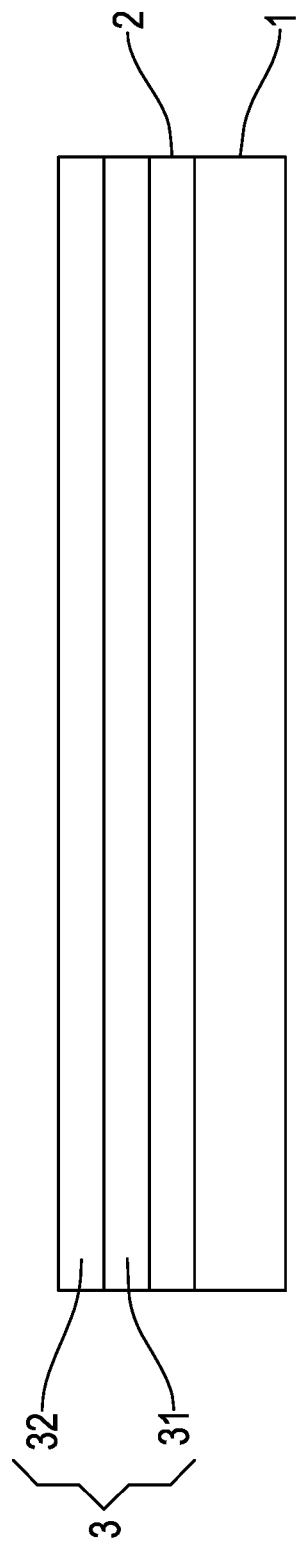
FIG. 4 is a schematic side view of Example 3.

Example 3 of the synthetic leather of the instant disclosure is shown in FIG. 4, which has a similar structure to Example 1. The difference between Examples 1 and 3 is that the surface unit 3 of Example 3 is the combination of the functional layer 31 covering the polymer layer 2 and the print layer 32 covering the functional layer 31.

Preferably, the synthetic leather of Example 3 may optionally further comprise a second adhesive layer, which is disposed between the functional layer 31 and the polymer layer 2 (not shown in FIG. 4). Preferably, the second adhesive layer may have a thickness ranging from 0.01 mm to 0.08 mm. The adhesive used to form the second adhesive layer may be any of those as described in Example 1.

Figure 5:
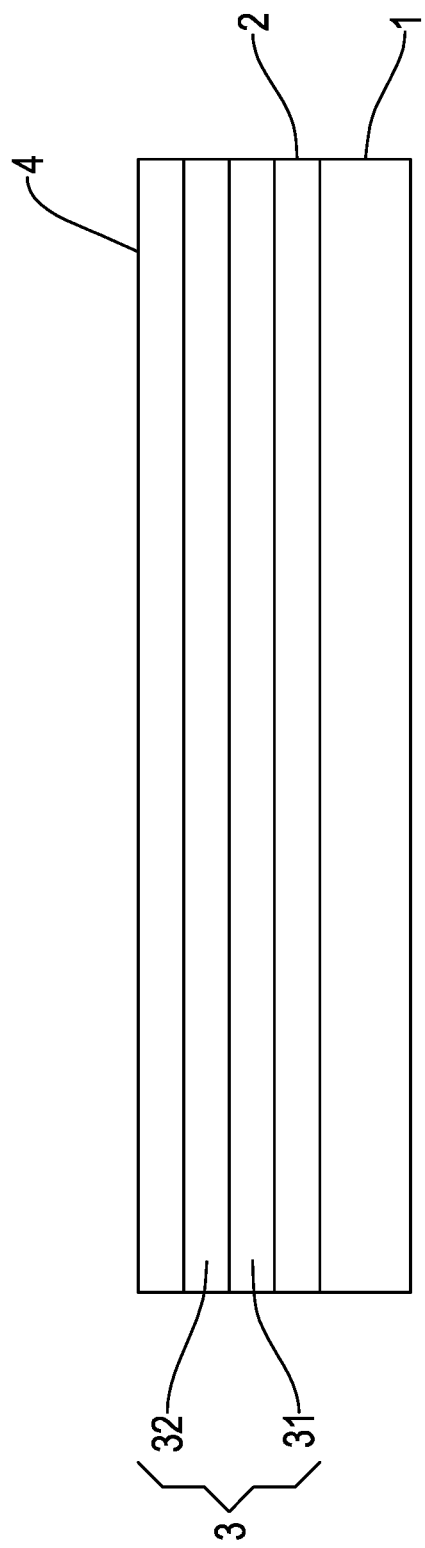
FIG. 5 is a schematic side view of Example 4.

Example 4 of the synthetic leather of the instant disclosure is shown in FIG. 5, which has a similar structure to Example 3. The difference between Examples 3 and 4 is that the synthetic leather of Example 4 further comprises a surface functional layer 4 covering the print layer 32. The surface functional layer 4 is similar to the functional layer 31 in the material components, preparation method, and the range of thickness, so the surface functional layer 4 can be prepared with reference to the preparation of the functional layer 31 of Example 1.

Preferably, the synthetic leather of Example 4 may optionally further comprise a second adhesive layer, which is disposed between the functional layer 31 and the polymer layer 2 (not shown in FIG. 5). Preferably, the second adhesive layer may have a thickness ranging from 0.01 mm to 0.08 mm. The adhesive used to form the second adhesive layer may be any of those as described in Example 1.

The synthetic leathers of Examples 1 to 4 may optionally further comprise a first adhesive layer, which is disposed between the polymer layer 2 and the base cloth 1. The thickness range of the first adhesive layer and the adhesive used to form the first adhesive layer can refer to those of the second adhesive layer.

Figure 6:
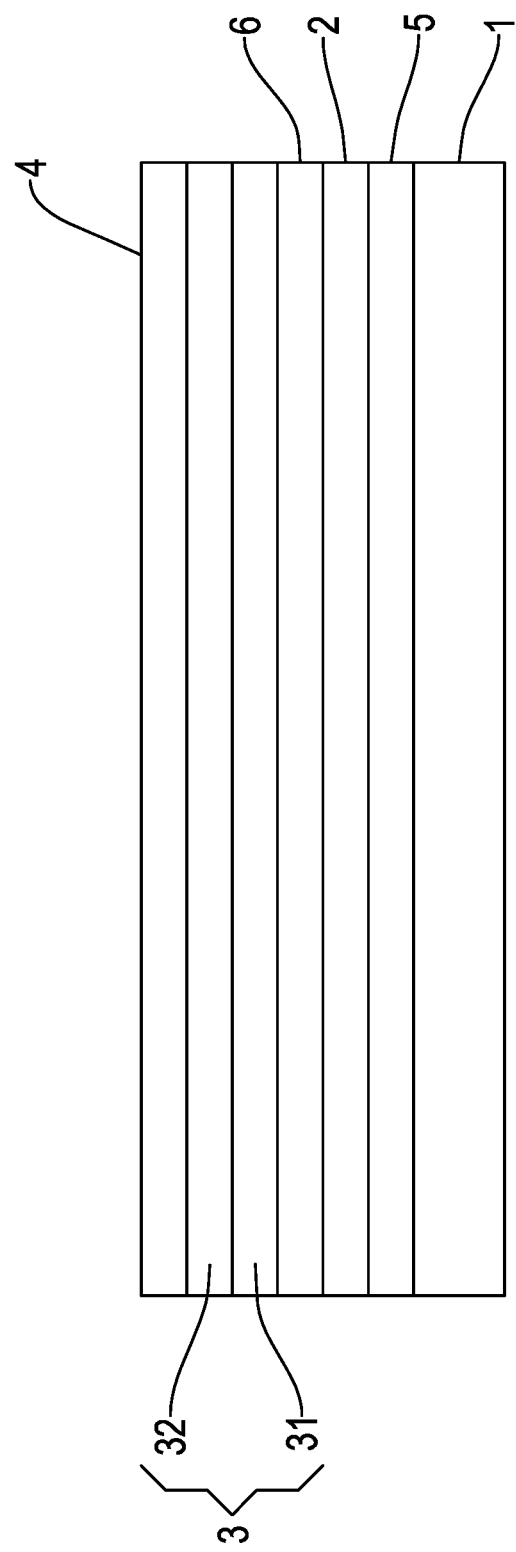
FIG. 6 is a schematic side view of Example 4 which further comprises first and second adhesive layers.

Taking the synthetic leather of Example 4 for example, when the synthetic leather further comprises a first adhesive layer and a second adhesive layer, the structure of the synthetic leather is shown in FIG. 6; the synthetic leather further comprises the first adhesive layer 5 disposed between the base cloth 1 and the polymer layer 2, and the second adhesive layer 6 disposed between the functional layer 31 and the polymer layer 2.

Characteristic Analysis: Flexing Resistance Test at Low Temperature

Figure 1:
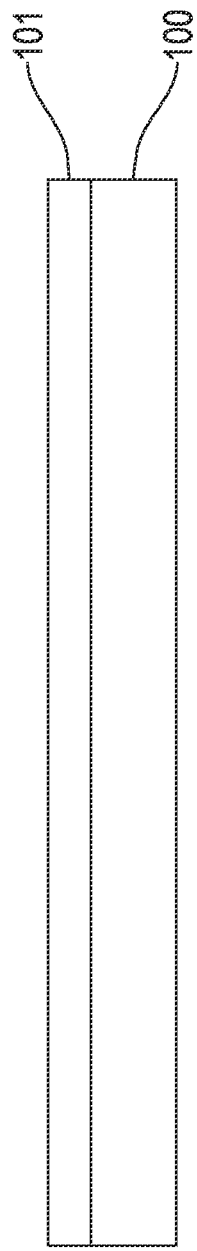
FIG. 1 is a schematic side view of a conventional laminate with a PVB layer.

In order to ensure the significance of this characteristic analysis, each of Examples and Reference Example was analyzed by the same experimental method, ASTM D6182 standard method. All of Example 1-1 to Example 1-4 respectively had a laminate structure as shown in FIG. 2, and the main difference between Examples 1-1 to 1-4 was the thickness of the functional layer 31. On the other hand, Reference Example did not have a functional layer 31 and a laminate structure as shown in FIG. 1.

The base cloths 1 of Examples 1-1 to 1-4 and the fabric layer 100 of Reference Example: a knitted fabric with a thickness of 0.30 mm.

The polymer layers 2 of Examples 1-1 to 1-4 and first film layer 101 of Reference Example: a PVB-based layer with a thickness of 0.45 mm and a Shore A hardness of 42A.

The functional layers 31 of Examples 1-1 to 1-4: each of the functional layer 31 was formed by coating an oily solution on the polymer layer 2; wherein the oily solution comprised an oil-based ether-type PU and an oil-based isocyanate crosslinking agent. In the oily solution, relative to 100 parts by weight of the oil-based ether-type PU, the oil-based isocyanate crosslinking agent was in an amount of 7 parts by weight. The oily solution had a solid content of 25 wt % of the oil-based ether-type PU. The oily solution had a viscosity of 2,500 centipoises (cps). In addition, the functional layers 31 had a Shore A hardness of 85A.

TABLE 4

| Example/Reference Example No. | Thickness of Functional Layer 31 (mm) | Flexing resistance (number of times)/Temperature | | | |
|---|---|---|---|---|---|
| | | 25° C. | 10° C. | 0° C. | −5° C. |
| Example 1-1 | 0.03 | 50,000 | 18,000 | 3,500 | 1,200 |
| Example 1-2 | 0.08 | 80,000 | 35,000 | 12,500 | 15,600 |
| Example 1-3 | 0.10 | 120,000 | 60,000 | 24,500 | 22,800 |
| Example 1-4 | 0.15 | 150,000 | 80,000 | 45,500 | 24,600 |
| Reference Example | 0.00 | 32,000 | 15,000 | 1,000 | 600 |

From the results of flexing resistance test in Table 4, it is clear that with the functional layer, Examples 1-1 to 1-4 respectively have good flexing resistance at low temperature.

In conclusion, by means of disposing the surface unit on the polymer layer formed by a PVB-based composition, the synthetic leather of the instant disclosure can prevent problems such as an unfavorable touch feeling caused by stickiness at a temperature equal to or above 30° C., insufficient surface abrasion resistance, and poor flexing resistance at low temperature, so the synthetic leather indeed can achieve the objective of the instant disclosure.

Even though numerous characteristics and advantages of the instant disclosure have been set forth in the foregoing description, together with details of the structure and features of the disclosure, the disclosure is illustrative only. Changes may be made in the details, especially in matters of shape, size, and arrangement of parts within the principles of the disclosure to the full extent indicated by the broad general meaning of the terms in which the appended claims are expressed.

What is claimed is:

1. A synthetic leather, comprising:
   a base cloth;
   a polymer layer which is formed on the base cloth; wherein the polymer layer is made of a polyvinyl butyral-based composition; wherein the polyvinyl butyral-based composition comprises polyvinyl butyral and a plasticizer component, but the polyvinyl butyral-based composition excludes a crosslinking agent with at least one isocyanate group; and
   a surface unit which covers the polymer layer; wherein the surface unit is a functional layer or a combination of the functional layer and a print layer; wherein the functional layer is made of a material containing a primary agent and a crosslinking agent; the primary agent is polyurethane, epoxy resin, polymethylacrylate or polyvinyl butyral; when the primary agent is the polyvinyl butyral, the crosslinking agent comprises a crosslinking agent with at least one isocyanate group;
   wherein the functional layer has a Shore hardness of 40A to 80D, and the polymer layer has a Shore hardness of 20A to 50D.

2. The synthetic leather as claimed in claim 1, wherein the surface unit is the functional layer.

3. The synthetic leather as claimed in claim 2, wherein the synthetic leather further comprises an adhesive layer, which is disposed between the functional layer and the polymer layer.

4. The synthetic leather as claimed in claim 2, wherein the synthetic leather further comprises an adhesive layer, which is disposed between the base cloth and the polymer layer.

5. The synthetic leather as claimed in claim 2, wherein the primary agent is the polyurethane, and the crosslinking agent comprises a crosslinking agent with at least one isocyanate group.

6. The synthetic leather as claimed in claim 1, wherein the surface unit is the combination of the functional layer and the print layer; wherein the print layer covers the polymer layer, and the functional layer covers the print layer.

7. The synthetic leather as claimed in claim 6, wherein the synthetic leather further comprises an adhesive layer, which is disposed between the print layer and the polymer layer.

8. The synthetic leather as claimed in claim 6, wherein the synthetic leather further comprises an adhesive layer, which is disposed between the base cloth and the polymer layer.

9. The synthetic leather as claimed in claim 6, wherein the primary agent is the polyurethane, and the crosslinking agent comprises a crosslinking agent with at least one isocyanate group.

10. The synthetic leather as claimed in claim 1, wherein the surface unit is the combination of the functional layer and the print layer; wherein the functional layer covers the polymer layer, and the print layer covers the functional layer.

11. The synthetic leather as claimed in claim 10, wherein the synthetic leather further comprises an adhesive layer, which is disposed between the functional layer and the polymer layer.

12. The synthetic leather as claimed in claim 10, wherein the synthetic leather further comprises a surface functional layer, which is formed on the print layer.

13. The synthetic leather as claimed in claim 12, wherein the synthetic leather further comprises an adhesive layer, which is disposed between the functional layer and the polymer layer.

14. The synthetic leather as claimed in claim 13, wherein the synthetic leather further comprises another adhesive layer, which is disposed between the base cloth and the polymer layer.

15. The synthetic leather as claimed in claim 13, wherein the primary agent is the polyurethane, and the crosslinking agent comprises a crosslinking agent with at least one isocyanate group.

16. The synthetic leather as claimed in claim 12, wherein the synthetic leather further comprises an adhesive layer, which is disposed between the base cloth and the polymer layer.

17. The synthetic leather as claimed in claim 10, wherein the synthetic leather further comprises an adhesive layer, which is disposed between the base cloth and the polymer layer.

18. The synthetic leather as claimed in claim 10, wherein the primary agent is the polyurethane, and the crosslinking agent comprises a crosslinking agent with at least one isocyanate group.

19. The synthetic leather as claimed in claim 1, wherein the synthetic leather further comprises an adhesive layer, which is disposed between the base cloth and the polymer layer.

20. The synthetic leather as claimed in claim 1, wherein the primary agent is the polyurethane, and the crosslinking agent comprises a crosslinking agent with at least one isocyanate group.

* * * * *